Sept. 30, 1958   C. DONALDSON   2,854,031
PLASTIC TUBING
Original Filed April 11, 1952

40% Resin Loaded

1-Ply Of Parallel Fiberglass Ends

3 Ply

Multi-Ply Tube

Multi-Ply Tube

INVENTOR.
CHASE DONALDSON
BY
Semmes & Semmes
ATTORNEYS

2,854,031
PLASTIC TUBING

Chase Donaldson, Mount Vernon, N. Y.

Original application April 11, 1952, Serial No. 281,859, now Patent No. 2,803,576, dated August 20, 1957. Divided and this application January 26, 1954, Serial No. 406,167

9 Claims. (Cl. 138—78)

This invention relates generally to laminated fabrics and the method of making the same and more particularly to fiber-glass reinforced resin laminated fabrics, pipes and tubing, and other items and to the methods of forming the same. This application is a division of my application Serial No. 281,859 filed April 11, 1952 now Patent No. 2,803,576.

Various methods of forming fiberglass reinforced resin fabrics and tubing are known in the art but none of these methods or products have been successful from a commercial standpoint for a wide variety of reasons.

For example, the material most widely employed in prior art practices is woven fiberglass cloth which has an objectionably high cost per pound, must be heat cleaned to remove the initial starch from the cloth, and requires the application of finishes to enable the resin to adhere to the cloth to a greater extent.

Another prior art method involves the use of a fiberglass mat formed of random fibers which is less expensive than woven cloth. However, irregular and hence unsatisfactory results are obtained, especially in the formation of tubing, due to the difficulty of controlling the quality of the random fibers mat as to their distribution and weight.

A further and more recent prior art method known as filament winding has produced results which are more satisfactory from a strength standpoint but which are still objectionable in that irregularities are produced with a high proportion of rejects and porosity in the tubing. This operation consists in the impregnating of fiberglass yarn or roving with resin at the time of manufacture of the tube and winding it onto a revolving mandrel using a multiplicity of heads, each of them carrying one or more fibers or strands of yarn. The disadvantages of this method are three-fold. It is not a continuous process in that only a given length of tubing can be made depending upon the length of the mandrel employed. Fiberglas yarn does not accept resin impregnation readily, or rapidly and the speed of the process is somewhat limited to the rate at which the yarn can be successfully impregnated, whether through a bath process, speed rollers, or otherwise.

Accordingly, the chief object of the present invention is to provide an improved reinforced laminated fabric, tubing, etc. and method of forming the same which will obviate the above mentioned disadvantages characterizing the prior art products and methods of forming the same.

Another important object of the present invention is to provide an improved reinforced laminated fabric, tubing, etc. and method of forming the same which will be of higher bursting strength than that formed by known prior art methods and of lower cost, susceptible of ready control in manufacture, and durable in use.

Other objects and advantages of the present invention will become apparent during the course of the following description.

In its broadest aspects, the invention contemplates a laminated fabric, tubing, etc. and method of forming the same from a highly absorbent paper which will readily accept a binder at high speeds and then restrain in parallel patterns, the reinforcing yarn deposited thereon.

In the drawings, I have shown two embodiments of the invention. In these showings:

Figure 1:
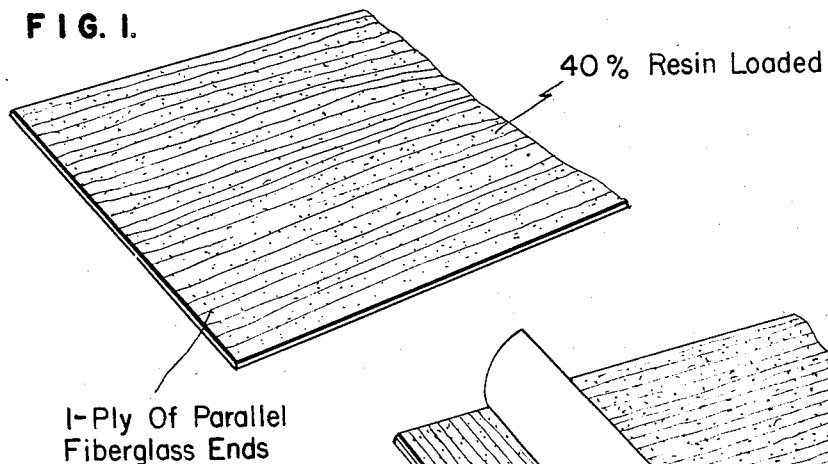
Figure 1 is a perspective view of a laminated fabric formed in accordance with the method comprising a part of the invention.

In the practice of my invention, a dense highly absorbent paper, thoroughly preimpregnated with uncured resin, has continuously laid thereon any number of individual fibers or "ends" of yarn per inch up to a maximum possible depending upon their diameters. The thinness of the paper is highly important in order to add the least amount of bulk to the end product and to obtain a higher proportion of reinforcing yarn fibers so as to increase its strength. The paper is preferably also highly absorbent so that it will pick up and accept the adhesive or binder, such as resin, from conventional coating equipment or impregnating rollers at high speed. Further, the paper functions to restrain the fibers in parallel patterns when they are bonded to the paper due to its loading with resin.

It is preferable to use a paper stock which is inert and in which there is no element or impurity which might inhibit or affect the cure of the resin. The strength of the paper is not important as the strength of the laminae comes almost entirely from the glass, etc. reinforcing fibers. For example, forty-five fiber ends per inch are laid on .003 inch thick No. 811 rag stock paper which tests about 200 lbs. pull and the paper alone contributes no more than twenty pounds to the overall strength. Thus, a reasonably good grade of asbestos paper, rag stock paper, or newsprint may be employed but kraft paper is preferred for its cheapness and relative degree of strength.

A paper which is in some instances preferred is one made of superfine glass fibers which have an insoluble resin-forming compound of the thermosetting type suspended in the pulp from which the paper is prepared. The paper of very fine glass fibers, as contrasted with the ordinary fiberglass, has a disadvantage resulting from its low tensile strength, but after setting of the resin, a tube of improved physical properties, particularly from an electrical standpoint, may be obtained.

Fiberglas is preferred as a reinforcing medium but there are any number of fibers which may be employed although not comparing favorably with fiberglass from the standpoint of stability and tensile strength. Where the organic character of fibers is not important, and where cost is more of a consideration and lower strength may be required, other fibers such as ramie, long fiber cotton, linen, jute, hemp, etc. may readily be employed.

Resins employed

For use as an adhesive or binder, a contact uncured resin of the thermosetting type which can be dissolved in acetone or other solvents is preferred. Such an uncured resin is preferably either crystalline in structure so as to be ground up into fine particles or in the form of a powder to insure good physical distribution. Two such resins with which particular success has been obtained is "G-382," a polyfumarate made by the Atlas Powder Company used separately or in combination with diallyl phthalate made and distributed by the Shell Chemical Company. Two other resins which are acceptable for this same use are "Epon" series made by the Shell Chemical Company as well as certain resins made by the Ciba Corporation under the name "Araldite" both of which are of the epoxylene series. Certain polyesters may also be used advantageously. In general, the resins are preferably of the low pressure or "contact" type which may be set without the necessity of high pressure. The "low temperature" resins which set at substantially room temperature are not as desirable as those requiring higher temperatures for curing because of their lower final strength and resistance to distortion by heat.

It is essential with the above contact resins to preimpregnate the paper so that it has an adequate resin loading, up to 40% by weight, for fabrics. In the forming of tubing, additional resin is used up to an ultimate loading of 45% or 50% by weight if the tube is to be well laminated and non-porous. It is to be noted that this combination of a resin preimpregnated paper plus the use of an additional quantity of solutions of resins, commonly designated as wet resins, compatible therewith is an important feature of the invention. The use of the preimpregnation resin which in itself is tacky to hold down the reinforcing fibers or yarn while it is being laid on, takes the place of the 5-8%, by weight, adhesive coating previously employed. The degree of tackiness of the impregnated paper is a function of the compounding of the resins. For example, if a high proportion of resin knwn as diallyl phthalate has been used but is not over 25%, the end impregnated material is highly tacky, and what is known in the art as "drapery." Furthermore, if a high proportion of so-called flexible resins are used, the degree of flexibility of the preimpregnated paper and of the end product is increased.

Preimpregnation of paper stock

The uncured resin is compounded with inhibitors, catalysts, etc. to effect the particular end result in question and dissolved in a suitable solvent which will depend on the particular resin. Often and particularly with materials of high moisture content, such as asbestos paper, it is desirable that the paper be dried prior to impregnation to minimize the formation of voids on curing. The paper is then run through the resin bath, or preferably, over a roller on which there is a spreader knife to secure uniform distribution of the resin on the paper. This suffices for preimpregnation due to the thinness and highly absorbent character of the paper combined with the good flow and penetrating characteristics of the resin solution employed. The flow depends upon the base viscosity of the resin, the fineness of the powered resin employed, and the degree of dilution with solvents.

For normal operation, a 10-15% solution of acetone, i. e., 85% solid resin, has proven satisfactory and gives a sufficiently tacky coated surface so that the fibers will readily adhere thereto. This is accomplished at substantially higher speeds and with materially less irregularity in the lay-on of the yarn than with phenolic or other adhesives which are customarily employed. It is not necessary to sprinkle dry resin powder on the coated surface following the lay-on of the fiber as a 40% by weight resin loading remains in the paper after driving off the solvent. This resin loading may be varied from 25-40% by weight on the initial impregnation. The resin, in turn can be loaded up to 20-30% by weight with inert material such as mica, silica, calcium carbonate or other fillers.

The balance of the impregnation is secured at the time of roll-up or lamination when a wet lay-up resin is employed and its viscosity is varied by the compound operation and by the use of a different viscosity to obtain the requisite flow of the wet lay-up or adhesive resin.

In some cases it is desirable to pass the paper through the heated oven at a temperature above 212° F. prior to impregnation, in order to drive off most of the moisture in the paper. Asbestos paper, for example, retains 2½% moisture which is driven off at the time the solvent is extracted. Better laminates may be obtained by driving off the paper moisture first by passing it through the oven and then impregnating in the manner described. The resin apparently takes the place of the moisture in the cellular structure of the paper and when set by thermal action, there is little tendency for the paper per se to absorb moisture as it would otherwise do.

Method of forming reinforced, preimpregnated fabric

After the paper of the type described has been preimpregnated in the manner set forth, the paper is continuously fed past apparatus which deposite fiberglass yarn or fibers thereon in parallel strands. The resin is tacky enough to hold the fibers in place on the paper until it is run through the drying oven which dries off the solvent, usually from 10-15%, and leaves a partially tacky but impregnated reinforced paper, as shown in Figure 1, which may be stored or immediately used in the manufacture of laminated fabrics by uniting several sheets (Figure 2), tubing (Figure 3) or other products.

Figure 2:
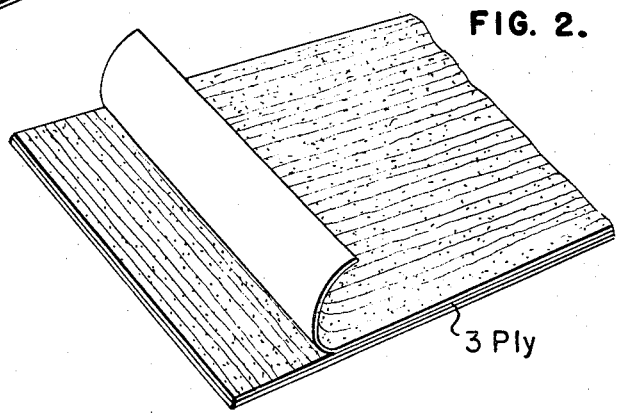
Figure 2 is a perspective view of a similar fabric formed of plural laminae.
Figure 3:
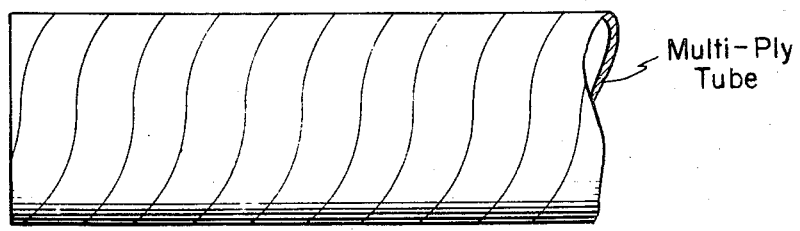
Figure 3 is an elevation view of tubing formed in accordance with a modification of the invention; and, Figure 4 is a perspective view of another type of said tubing.
Figure 4:
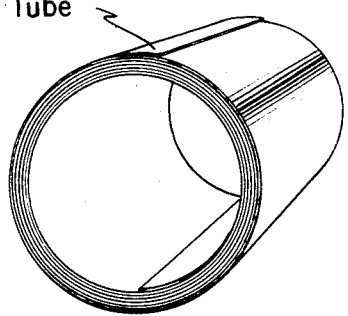

In the formation of laminated fabric, it is generally desirable to have the reinforcing fibers running in different directions, as illustrated in Figure 2, in the several sheets. The relative strength in the different dimensions of the paper can be controlled by the number of ends per inch in the separate sheets, or by the number of sheets having the reinforcing fibers running in one particular direction. While it is possible to apply reinforcing fibers running in different directions to the same preimpregnated sheet, it is generally preferable from an operational standpoint to have only fibers running in one direction on each preimpregnated sheet and control the strength in different directions during the lamination operation.

If the impregnated reinforced paper is to be stored for all or a portion of its estimated shelf life of 6-12 months, steps must be taken to prevent the rolls from sticking together. During the formation of the rolls, they are interleafed with polyethylene or cellophane which is rolled on simultaneously and which is correspondingly unrolled and removed in the manufacture of tubing, etc. Another material which may be successfully utilized for interleafing purposes is an extremely thin absorbent piece of paper such as .003 inch unimpregnated rag stock which gradually absorbs resin from the adjoining separated sheets of the roll. A high strength tubing has been formed from .007 inch asbestos paper impregnated in this manner and reinforced with yarn. When stored, the paper from which the tube was formed was interleafed with .003 inch rag stock paper to keep the roll from sticking together.

In forming the impregnated reinforced paper above described, the paper webs can be up to any desired width during forming, depending on the width of the paper available, and then be split for spiral tube winding in the desired tape widths depending upon the tube diameters, or it can be wound up on a conventional convolute tube winding machine. Thus, the preimpregnated, reinforced and faced paper may be handled, insofar as the tube making equipment is concerned, exactly like kraft or other paper normally used in making paper tubes.

Method of forming reinforced fabric tubing

A tube may be formed from the impregnated and reinforced fabric either by convolute rolling the fabric or by spiral winding a relatively narrow strip in conventional spiral winding tube forming equipment. In most instances, the tube will be formed on a metallic mandrel which supports the fabric during the winding operation. During the winding of the tube the tension on the fabric and the application of pressure from rolls aids in the formation of a dense, uniform structure. Generally, it is preferred to add additional resin while forming the tube to increase the amount of resin in the final structure.

The uncured resin may be sprayed on if of the wet type, or applied with conventional roller coaters with or without doctor knives, succession baths, or the like, or may be added as a dry finely ground powder directly between successive laminae in the tube rolling operation.

As stated, in the initial formation of the laminated paper in the tube rolling or laminated operation, the surface or the adhesive resin used between each ply is tacky. When rolled under light pressure or tension, and particularly if rolled with an additional wet resin, the air is squeezed out and replaced by resin. The surface tension or fluid friction, or in some cases, the tackiness and adhesion of the resin itself, causes the plies to stick together until such time as the tube is cured by heat which causes the resin to set. Thus, a continuous homogeneous tube is formed which does not delaminate under high impact of loading depending on the composition of the resin employed.

A pressure roll in the formation of convolutely wrapped tubing is desirable as it effects a more even distribution of the liquid resin being applied in the tube rolling operation which requires extreme care. The minimum roller pressure should be about 20–25 pounds per square inch depending upon the weight of the roll, its rotary speed, the diameter of the tube being rolled, etc.

Another feature of the method of spiral tube wrapping is to first form a standard paper tube with an external cellophane coating, to then carry on with successive laminations of the impregnated material, finishing off with another paper tube having cellophane, etc. on the inside, i. e., next to the preimpregnated material. These paper tubes serve to hold the item in place during curing and subsequently slip off. The use of cellophane, etc. either on the mandrel or outside of the tube that is rolled, be it spiral or convolute, is chiefly for the purpose of containing the resin within the tube. The ends of the cellophane wrapping may be taped to prevent such flow. Certain resins of the polyester type are, to a certain extent, inhibited by the presence of air during the curing operation; other resins such as the "Epons" are not so inhibited but do tend to flow from the application of heat which eventually results in an air-tight cure.

In the formation of tubes to have high burst or compressive characteristics as in rockets, it is desirable to have twice as much strength in the hoop direction as in the axial direction. Twice as many strands of fibers are therefore laid convolutely or hoop-wise as axially which requires a cross laminating technique. This may be readily effected either prior to or at the time of the roll-up of the tube either by varying the number of layers to be cross-laminated, i. e., half as many cross-laminated as hoop-wise, or by reducing to half the number of strands of fiber which may be laid in the axial direction, i. e., ninety ends to the inch in the hoop direction and forty-five ends to the inch for the paper employed for the cross-lamination in the axial direction as described in connection with the formation of the laminated sheet. The burst value may also be increased by employing a substantial proportion of the hoop-wise fibers next to the inner surface of the tube as stresses are highest there, decreasing toward the outer wall especially in thick walled objects.

The angle of the spiral winding affects the strength of the tube in either the hoop or axial direction. Theoretically, an angle of sixty degrees from the horizontal gives twice as much strength in the hoop as in the axial direction. The diameter of a tube will effect the width of the tape to be used in its winding. The greatest strength is obtained by an S and a Z wind, i. e., one course right-handed and one left. Any number of courses or plies can be laid on in one direction and alternated with other plies in the opposite direction in accordance with the purpose and structural requirements of the tube.

Curing of the resin

The curing of the tubes depends upon the particular resin, the catalyst employed, and in some cases, the use of promoters which accelerate the cure or even cause the resin to set at room temperature. The resin which is caused to set at the proper heat required for it, has stronger end characteristics than those cured at room temperature or below.

As an example, a resin compound comprising approximately 80% G–382 and 20% diallyl phthalate requires about 280° F. for curing in five minutes with a ⅛ inch thick wall. This can be varied by varying the nature of catalysts compounded with the resin. Inhibitors which increase the shelf life of the resin and of the preimpregnated paper may also be used. The inhibitors act to inhibit the action of the catalysts until the appropriate degree of heat is employed and thus prevent the setting up of the resin under normal conditions of heat, pressure or long storage. Heating to the temperature necessary for curing can be accomplished by placing the tube in an oven, heating in a stream of air, heating the mandrel, or other means for obtaining the necessary temperature.

Another and preferred method of curing the tubes is to add a high concentration of promoter, either with or without additional resin, between the plies in the tube forming operation. The promoter activates the catalyst, probably by initiating an exothermic reaction which raises the temperature to a level at which the catalyst is effective. The particular promoter employed will, of course, depend on the catalyst and resin. Overheating of the resin can be prevented by control of the amount and type of the promoter.

The tubes formed are different in a chemical sense in that the filler, for example, actually consists of the asbestos paper employed in addition to such other fillers as may be used, the fiberglass yarn being a filler as well as a reinforcing medium. As a typical example, the overall composition of a finished tube may be approximately 45% resin, 25% glass, and 30% paper where one-third of the paper is rag stock and the other two-thirds asbestos fiber paper.

Wherever the terms "resin, fiber, paper" are used in this specification and in the claims, they are intended to refer to any of the preferred materials set forth in this specification as suitable for the purposes of the present invention.

It is to be understood that the forms of the invention herewith shown and described are to be taken as preferred examples of the same and that various changes in the shape, size and arrangement of parts may be resorted to without departure from the spirit of invention or the scope of the subjected claims.

What I claim is:

1. A tube comprising plies of thin absorbent sheets, each having fibers adhesively secured to a surface by a cured 40% by weight loading of a contact resin in the sheets said resin loading uniting adjoining surfaces.

2. A tube comprising plies of thin absorbent sheets, each having fibers adhesively secured to a surface in parallelism by a cured 40% by weight loading of a contact resin in the sheets said resin loading uniting adjoining surfaces.

3. A tube comprising plies of thin absorbent sheets, each having fibers adhesively secured to a surface by a cured contact resin impregnation therein, said fibers being concentrated adjacent the inner face of said tube.

4. A tube comprising plies of thin absorbent sheets, each having fibers adhesively secured to a surface by a cured contact resin impregnation therein, said plies being spirally wound.

5. A tube comprising plies of thin absorbent sheets, each having fibers adhesively secured to a surface by a cured contact resin impregnation therein, said plies being cross-laminated.

6. A tube comprising plies of thin absorbent sheets, each having fibers adhesively secured to a surface by a cured contact resin impregnation therein, said plies being secured to each other by said resin in said sheets and by added resin interposed between adjoining plies.

7. A tube as defined in claim 6 in which the fibers are of glass.

8. A tube comprising a cured resin-bonded laminate made up of alternate layers of (1) thin fibrous sheet material and (2) generally parallel, closely spaced fiber strands, each such layer of sheet material consisting of helically extending convolutions of tape and having a cured resin impregnation extending therethrough, each such layer of strands including helically extending convolutions of a group of said strands extending along and wholly within the confines of the convolutions of tape making up an adjacent layer of sheet material, such group of strands being bonded to such adjacent layer of sheet material by the cured resin impregnation thereof, said tube being characterized by unusually high hoop strength derived primarily from said strands and said layers of sheet material serving to prevent strand-to-strand contact in directions radially of the tube.

9. A tube in accordance with claim 8 and wherein said layers of sheet material each consist of helically extending convolutions of thin asbestos paper tape.

References Cited in the file of this patent
UNITED STATES PATENTS

| | | |
|---|---|---|
| 637,636 | Meyer | Nov. 21, 1899 |
| 1,269,140 | Wheildon | June 11, 1918 |
| 2,456,923 | Cogovan et al. | Dec. 21, 1948 |
| 2,552,599 | Stout | May 15, 1951 |
| 2,637,674 | Stahl | May 5, 1953 |
| 2,653,887 | Slayter | Sept. 29, 1953 |